United States Patent
Nakhla et al.

(10) Patent No.: US 12,379,044 B2
(45) Date of Patent: Aug. 5, 2025

(54) BALL VALVE FOR AIRCRAFT TANK

(71) Applicant: MAG Aerospace Industries, LLC, Carson, CA (US)

(72) Inventors: Mario Nakhla, La Mirada, CA (US);
Christoph Goeschel, Seattle, WA (US);
Edita Salcepuedes, Ontario, CA (US);
Joerg Stachowski, San Pedro, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 51 days.

(21) Appl. No.: 17/631,310

(22) PCT Filed: Aug. 27, 2020

(86) PCT No.: PCT/US2020/048135
§ 371 (c)(1),
(2) Date: Jan. 28, 2022

(87) PCT Pub. No.: WO2021/041628
PCT Pub. Date: Mar. 4, 2021

(65) Prior Publication Data
US 2022/0260170 A1    Aug. 18, 2022

Related U.S. Application Data

(60) Provisional application No. 62/892,298, filed on Aug. 27, 2019.

(51) Int. Cl.
*F16K 27/06* (2006.01)
*B64D 11/02* (2006.01)
(Continued)

(52) U.S. Cl.
CPC ............ *F16K 27/067* (2013.01); *B64D 11/02* (2013.01); *F16K 31/60* (2013.01); *F16L 37/12* (2013.01)

(58) Field of Classification Search
CPC .. B64D 11/02; F16K 27/067; F16L 37/12–20; F16L 37/24–256;
(Continued)

(56) References Cited

U.S. PATENT DOCUMENTS

| 459,951 A | * | 9/1891 | Warner | F16L 37/252 |
| | | | | 439/352 |
| 1,814,927 A | * | 7/1931 | Hock | B01D 3/10 |
| | | | | 159/22 |

(Continued)

FOREIGN PATENT DOCUMENTS

| CN | 108953650 A | 12/2018 |
| DE | 19548340 C1 | 12/1996 |

(Continued)

OTHER PUBLICATIONS

English translation of Chinese Application No. CN202080059914.9, Office Action mailed on April 22, 2025, 5 pages. (Year: 2025).*

(Continued)

*Primary Examiner* — Craig J Price
(74) *Attorney, Agent, or Firm* — Kilpatrick Townsend & Stockton LLP

(57) ABSTRACT

A drain ball valve for an aircraft tank. Particular embodiments find use in connection with aircraft waste tanks. The drain ball valve has an upper shell that is shaped to be received within a tank drain plumbing line. The drain ball valve has a lower shell shaped to receive a funnel and/or a bellow component in order to help direct waste or other fluids exiting the tank.

18 Claims, 15 Drawing Sheets

(51) Int. Cl.
*F16K 31/60* (2006.01)
*F16L 37/12* (2006.01)

(58) Field of Classification Search
CPC ........ F01N 13/02; F01N 13/004; F01N 1/084;
F01N 13/1816; F01N 1/02; F01N
13/1805; F01N 1/089; F01N 2590/022;
B63B 34/10; B63H 21/32
USPC ....... 285/361, 396, 401, 402, 236, 235, 226,
285/229, 145.4, 145.5;
251/315.01–315.16; 137/565.36–592
See application file for complete search history.

(56) References Cited

U.S. PATENT DOCUMENTS

| | | | | |
|---|---|---|---|---|
| 3,367,623 | A * | 2/1968 | Piel | F16K 5/06 |
| | | | | 251/317 |
| 3,587,637 | A * | 6/1971 | Coleman | B65D 88/54 |
| | | | | 137/577.5 |
| 3,669,470 | A * | 6/1972 | Deurloo | H01R 13/56 |
| | | | | 285/146.1 |
| 4,137,935 | A | 2/1979 | Snowdon | |
| 4,659,117 | A * | 4/1987 | Holzhausen | F01N 13/1811 |
| | | | | 285/299 |
| 4,911,482 | A * | 3/1990 | Doat | F16L 27/111 |
| | | | | 285/923 |
| 5,069,487 | A * | 12/1991 | Sheppard | F01N 13/1811 |
| | | | | 285/123.1 |
| 5,090,746 | A * | 2/1992 | Holzhausen | F16L 27/0857 |
| | | | | 285/364 |
| 5,111,839 | A | 5/1992 | Schroepfer et al. | |
| 5,115,520 | A * | 5/1992 | Colebrook | B64D 11/02 |
| | | | | 4/321 |
| 5,137,259 | A | 8/1992 | Stein | |
| 5,145,215 | A * | 9/1992 | Udell | F16L 27/1004 |
| | | | | 285/226 |
| 5,167,430 | A * | 12/1992 | Bainbridge | F16L 27/1004 |
| | | | | 60/322 |
| 5,201,222 | A * | 4/1993 | Johnson | G01F 23/00 |
| | | | | 73/431 |
| 5,318,329 | A * | 6/1994 | Suzuki | F16L 27/0857 |
| | | | | 285/227 |
| 5,437,479 | A * | 8/1995 | Hartling | F16L 27/1004 |
| | | | | 285/226 |
| 5,511,828 | A * | 4/1996 | Kurek | F01N 13/1816 |
| | | | | 285/226 |
| 5,586,749 | A * | 12/1996 | Conley | F16K 27/067 |
| | | | | 251/315.15 |
| 5,611,577 | A * | 3/1997 | Meyer | F16L 27/04 |
| | | | | 285/261 |
| 5,806,899 | A * | 9/1998 | Norikawa | F01N 13/1816 |
| | | | | 285/299 |
| 5,967,565 | A * | 10/1999 | Kim | B60K 13/04 |
| | | | | 285/94 |
| 5,984,372 | A * | 11/1999 | Cwik | F01N 13/1811 |
| | | | | 29/454 |
| 6,047,952 | A * | 4/2000 | Laskaris | F16K 5/0663 |
| | | | | 251/315.11 |
| 6,086,110 | A * | 7/2000 | Lee | F01N 13/1883 |
| | | | | 285/368 |
| 6,151,893 | A * | 11/2000 | Watanabe | F01N 13/1816 |
| | | | | 285/299 |
| 6,296,282 | B1 * | 10/2001 | Burkhardt | F16L 27/111 |
| | | | | 285/227 |
| 6,354,632 | B1 * | 3/2002 | Jung | F16L 27/111 |
| | | | | 285/47 |
| 6,464,258 | B2 * | 10/2002 | Shin | F16L 27/1004 |
| | | | | 285/299 |
| 6,568,715 | B2 * | 5/2003 | Cwik | F01N 13/1816 |
| | | | | 285/368 |
| 6,688,929 | B2 * | 2/2004 | Lecours | F01N 13/02 |
| | | | | 440/89 R |
| 7,284,498 | B2 * | 10/2007 | Meads | A01J 3/00 |
| | | | | 119/14.21 |
| 8,042,840 | B2 * | 10/2011 | Chahine | F01N 13/1811 |
| | | | | 285/226 |
| 8,500,172 | B2 * | 8/2013 | Turfait | F16L 27/1004 |
| | | | | 285/226 |
| 9,574,335 | B2 * | 2/2017 | Hancosky | F16K 27/067 |
| 10,006,456 | B2 * | 6/2018 | Bazan | F04B 53/10 |
| 10,184,573 | B2 * | 1/2019 | Snowdon | F16K 5/201 |
| 10,253,284 | B2 * | 4/2019 | Blichmann | C12C 13/10 |
| 11,359,729 | B1 * | 6/2022 | Mason | F16K 11/0873 |
| 11,691,734 | B2 * | 7/2023 | Lutzer | B64D 11/02 |
| | | | | 137/899.2 |
| 11,739,848 | B2 * | 8/2023 | Newton | F16K 5/06 |
| | | | | 251/301 |
| 2001/0035514 | A1 * | 11/2001 | Laskaris | F16K 5/227 |
| | | | | 251/315.11 |
| 2003/0129892 | A1 | 7/2003 | Lecours et al. | |
| 2006/0197340 | A1 * | 9/2006 | Senoo | F16L 51/025 |
| | | | | 285/226 |
| 2016/0160733 | A1 * | 6/2016 | Barbely | F16L 27/111 |
| | | | | 285/226 |
| 2017/0198818 | A1 * | 7/2017 | Sett | F16K 15/1821 |

FOREIGN PATENT DOCUMENTS

| | | |
|---|---|---|
| DE | 102013113755 A1 | 6/2015 |
| EP | 0513592 A1 | 11/1992 |
| EP | 2527706 A1 | 11/2012 |

OTHER PUBLICATIONS

International Patent Application No. PCT/US2020/048135, International Search Report and Written Opinion, dated Dec. 1, 2020.
Europe Patent Application No. 20771389.2, Office Action (Communication pursuant to Article 94(3) EPC), dated Apr. 28, 2023.
Europe Appl. No. 20771389.2, Office Action, Dec. 22, 2023, 5 pages.
Chinese Application No. 202080059914.9, Office Action mailed on Nov. 30, 2024, 9 pages (8 pages of Original Document and 1 page of English Translation).
European Application No. 20771389.2, Intention to Grant mailed on Dec. 18, 2024, 9 pages.
Chinese Application No. CN202080059914.9, Office Action mailed on Apr. 22, 2025, 5 pages.

* cited by examiner

FIG 5 *(Prior art)*

BALL VALVE FOR AIRCRAFT TANK

This application claims the benefit of U.S. Provisional Application Ser. No. 62/892,298, filed Aug. 27, 2019 titled "Ball Valve for Aircraft Tank," the entire contents of which are hereby incorporated by reference.

FIELD OF THE DISCLOSURE

According to certain embodiments of this disclosure, there is provided a drain ball valve for an aircraft tank. Particular embodiments find use in connection with aircraft waste tanks. The drain ball valve has an upper shell that is shaped to be received within a tank drain plumbing line. The drain ball valve has a lower shell shaped to receive a funnel and/or a bellow component in order to help direct waste or other fluids exiting the tank.

BACKGROUND

Aircraft and other passenger transportation vehicles typically have onboard holding tanks that carry fluids, such as potable water, waste tanks, fuel tanks, and others. Many of these tanks have certain vacuum/pressure requirements due to their use on board aircraft and at high altitudes. Because of the enclosed nature of these tanks, it is also a requirement that they have a leak proof fittings.

Waste tank assemblies typically have a waste inlet, a rinse nozzle, and a tank drain or outlet. It is necessary for all of these areas of the tank and their accompanying connections to be able to withstand possible motion of the tank due to aircraft turbulence and possible expansion of the tank due to various temperature differences, all while managing fluid flow without leaking or dislodging.

With respect to wastewater holding tanks, a further requirement is that the waste holding tank be capable of being emptied or drained. For example, certain types of ball valves have been used to manage the waste drain. Ball valves are typically spherical units having a cylindrical passageway running through the unit. Control of drain ball valves may be via a lever. Movement of the lever into the open position aligns the cylindrical passageway with the waste holding tank and the exterior outlet drain, such that opening of the valve allows outflow of the waste material. Movement of the lever in the closed position can rotate the ball valve such that the valve body blocks both the holding tank and outlet drain. This prevents outflow of the waste material from the waste tank. Typically, a service technician manages opening and closing of the lever in order to drain the waste tank.

This disclosure relates specifically to an improved drain ball valve that manages fluid flow out of the tank. Various types of valves are provided for fluid flow out of aircraft waste tanks. In most instances, a conduit or other fluid carrying tube is attached to an outlet of the tank, leading the fluid exiting the tank to its ultimate destination. The exiting fluid (waste) is often delivered to and through a service panel for proper disposal.

SUMMARY

The disclosed drain ball valve has an upper shell that is shaped to be received within a tank drain plumbing line and a lower shell shaped to receive a funnel and/or a bellow component in order to help direct waste or other fluids exiting the tank. The drain ball valve finds particular use in connection with aircraft waste tanks.

The terms "invention," "the invention," "this invention" "the present invention," "disclosure," "the disclosure," and "the present disclosure," used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In one example, there is provided a drain ball valve for use in connection with a fluid-holding tank having a tank drain, the drain ball valve comprising an upper shell with an upper raised wall configured to be received within a plumbing line of the tank drain; and a lower shell comprising a connection area for receiving a bellow component. The upper shell may have a first circular flange, a curved face, and a second circular flange. The upper shell may also have a first upper circumference and a second lower circumference, wherein the second lower circumference is larger than the first upper circumference.

In use, the tank drain comprises an interface flange, and the interface flange and the first circular flange abut one another when the drain ball valve is positioned within the plumbing line. A may be used to secure the interface flange and first circular flange to one another.

In a further example, the lower shell of the valve may have a connection area that comprises a beaded end. If the valve is used with a bellow component, the bellow component may have an inner mating surface that cooperates with the connection area/beaded end of the lower shell. A clamp may be used to secure the bellow component to the lower shell.

In a further example, the valve is used with a funnel. In one example, funnel may have a hook and the lower shell may have a notch configured to receive the hook of the funnel.

In a further example, the valve may have a handle that cooperates with an arm to actuate the drain ball valve.

DETAILED DESCRIPTION

This disclosure is described with respect to a ball valve for use in connection with an aircraft waste tank, but it should be understood that the disclosed ball valve may be used in conjunction with any other types of tanks on board any other types of passenger transportation vehicles. The disclosed drain ball valve 10 incorporates a standard drain valve body 12 with improved upper and lower shells. The valve 10 also incorporates a standard shaft 82 and handle 84 to actuate the drain valve body 12.

Figure 1:
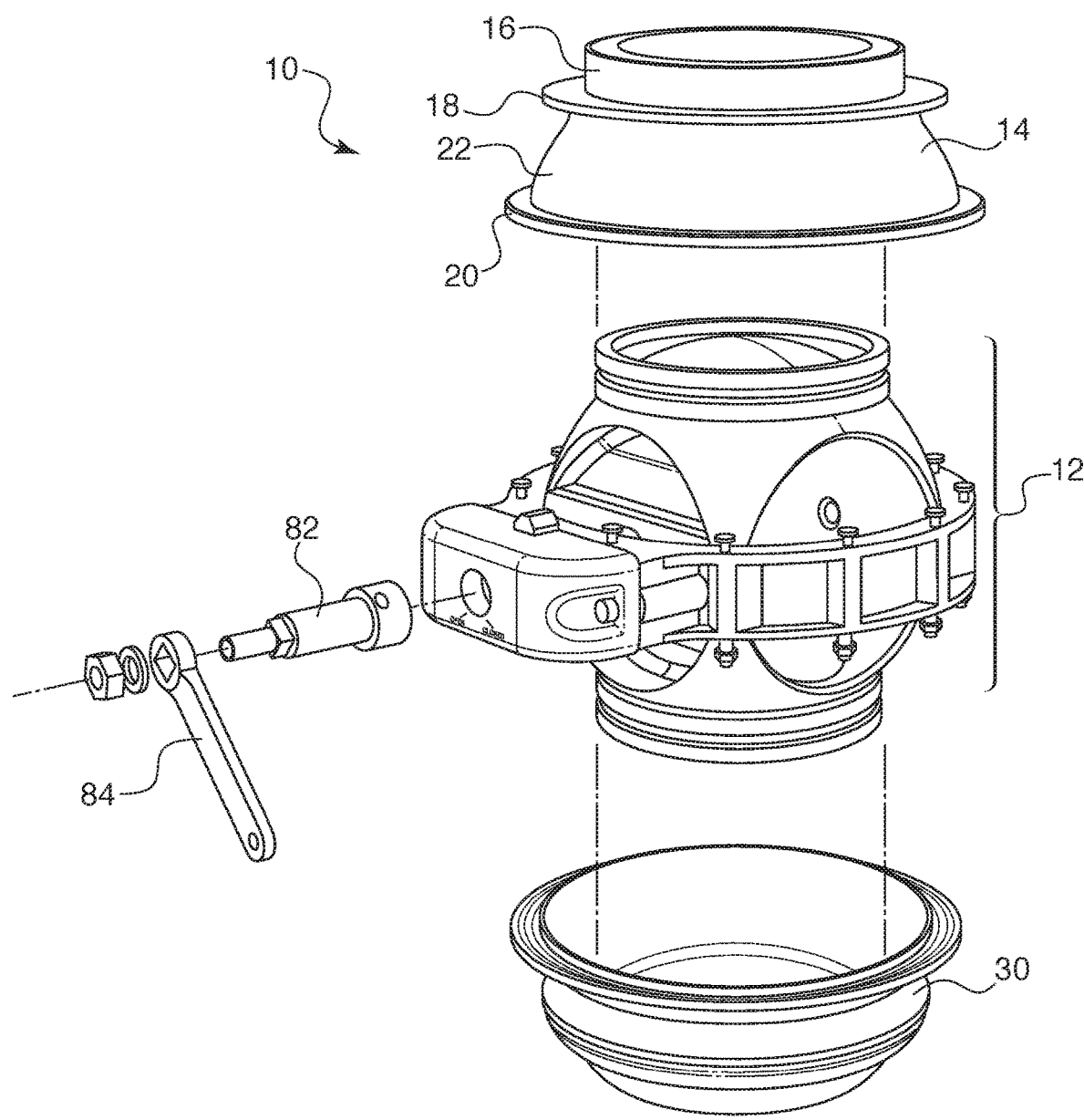
FIG. 1 shows an exploded perspective view of one embodiment of a drain ball valve.
Figure 2:
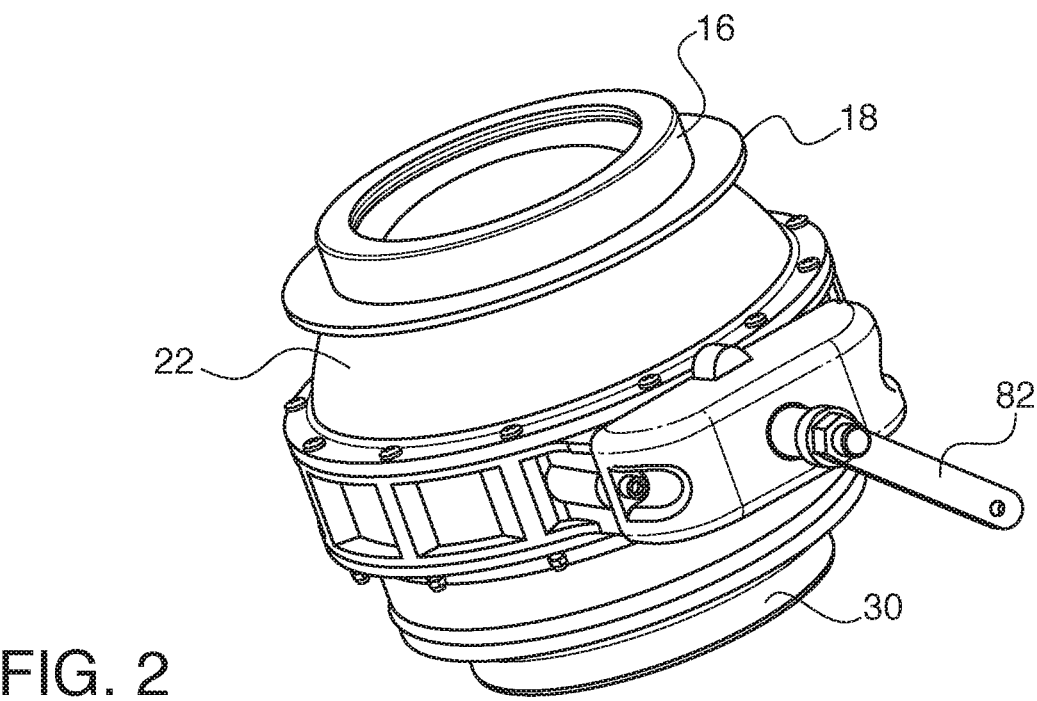
FIG. 2 shows a side perspective view of the drain ball valve of FIG. 1.
Figure 3:
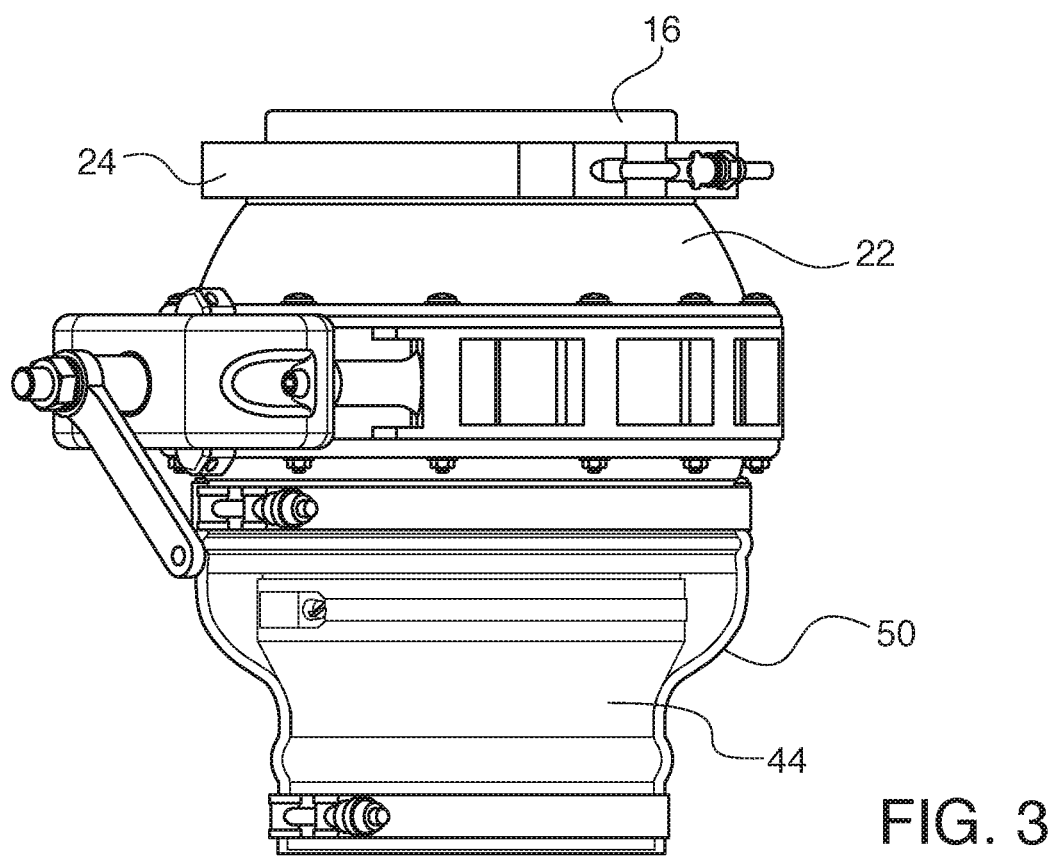
FIG. 3 shows a side plan view of the drain ball valve of FIG. 1, with a V-band coupling and a bellow component secured thereto.
Figure 4:
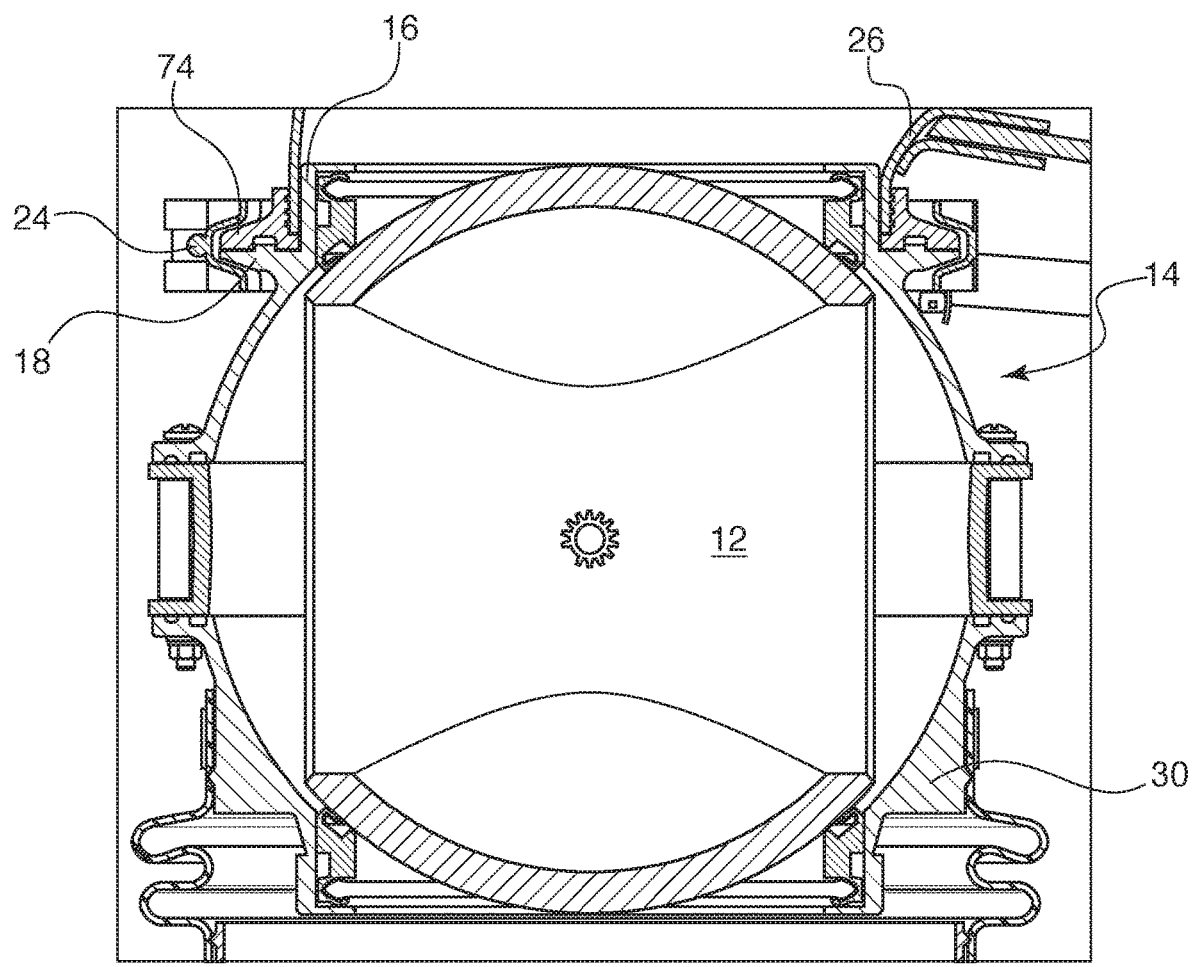
FIG. 4 shows a side cross-sectional view of the drain ball valve of FIG. 2.
Figure 6:
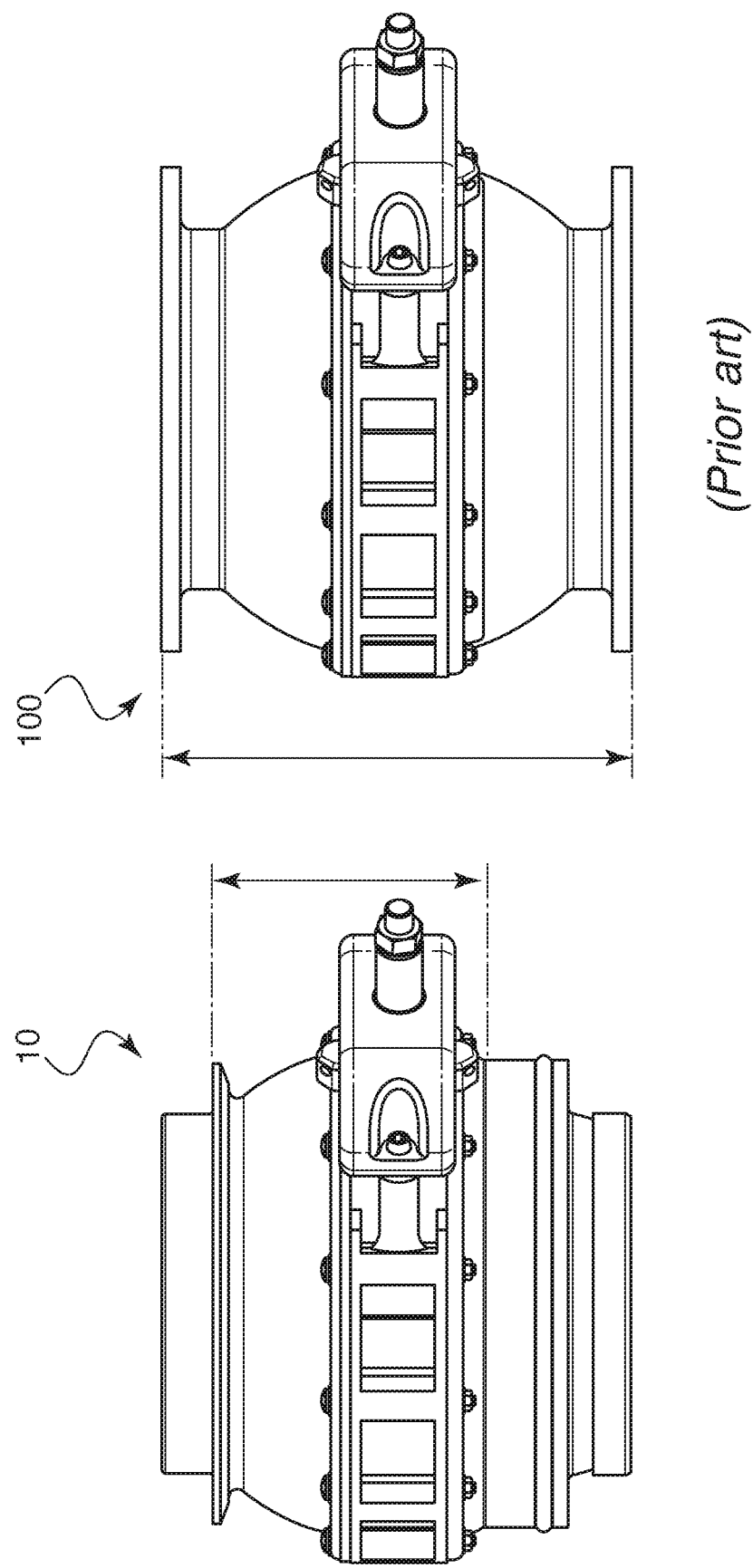
FIG. 6 shows a side-by-side perspective view of a prior art drain ball valve and one embodiment of the drain ball valve described herein.

Referring now to the exploded view of FIG. 1, as well as FIGS. 2-4, the upper shell 14 is shown having an upper raised wall 16. Upper raised wall 16 defines a first upper circumference. Upper raised wall 16 extends up from a first circular flange 18. Extending between the first circular flange 18 and a second circular flange 20 is a curved face 22. The second circular flange 20 defines a second lower circumference. The second lower circumference is larger than the first upper circumference. The curved face 22 curves outwardly from the first circumference to the second circumference. As shown by the assembled drain ball valve 10 in FIGS. 2-4 (and specifically by the cross-sectional view of FIG. 4), the upper raised wall 16 can be received by the upper interfacing plumbing line 26 of the waste tank. As shown by FIG. 6, this lowers the plane of the upper raised wall 16 such that the ball valve is more compact and smaller than previous versions. Once positioned, the first circular flange 18 can abut a lower end face of the interface flange 74 of tank drain. This is illustrated by the cross-sectional view of FIG. 4. These abutted flanges 18, 74 may then receive a V-band coupling 24 that secures around the first circular flange 18 and the V-band interface flange 74 in order to secure the upper shell 14 to the tank drain of a waste tank (described in more detail below).

Figure 5:
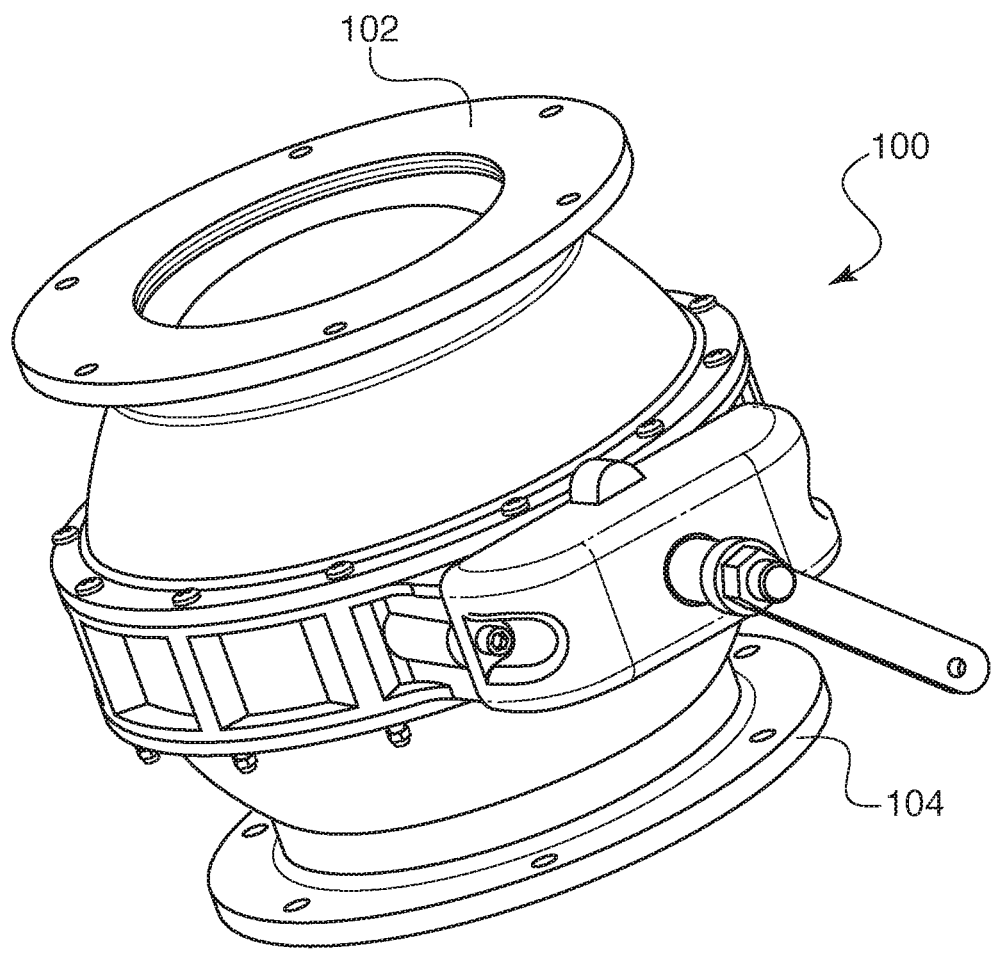
FIG. 5 shows a side perspective view of a prior art drain ball valve.

This is in contrast to securement of drain ball valves of the prior art. Referring now to FIG. 5, which illustrates a prior art drain ball valve 100, earlier valves had a flat top flange 102 that was attached to a plumbing tubing or line extending out from the waste tank, and a flat bottom flange 104 attached to the service panel. These types of prior art drain ball valves are not designed to be received by any part of the tank or tank tubing. Instead, they were attached in abutting relationship. By contrast, the currently disclosed drain ball valve 10 has an upper shell 14 that is shaped and configured to be received by and within the plumbing line 26 of the waste tank outlet. From a side cross sectional view, the upper shell 14 is essentially integrated into and with the waste tank outlet. It reaches inside of the plumbing line 26 of the tank. This can save space as compared to earlier drain ball valves. The new design does not require any change in the tank outlet or plumbing line size, nor does it require any change or alteration of the spring-loaded seals of the prior art. This can ensure preserved seal quality while reducing the required size of the ball valve.

By having the upper raised wall 16 reaching inside of the plumbing line 26, installation can also be eased because the raised wall 16 is centered with respect to and fits within the plumbing line 26, rather than requiring alignment of prior art flat top flange 100 with a lower end of the plumbing line. FIG. 6 illustrates a side-by-side comparison between a prior art drain ball valve 100 and the disclosed drain ball valve 10, and shows the possible space-saving features of the new valve for use in limited height environments.

Figure 7:
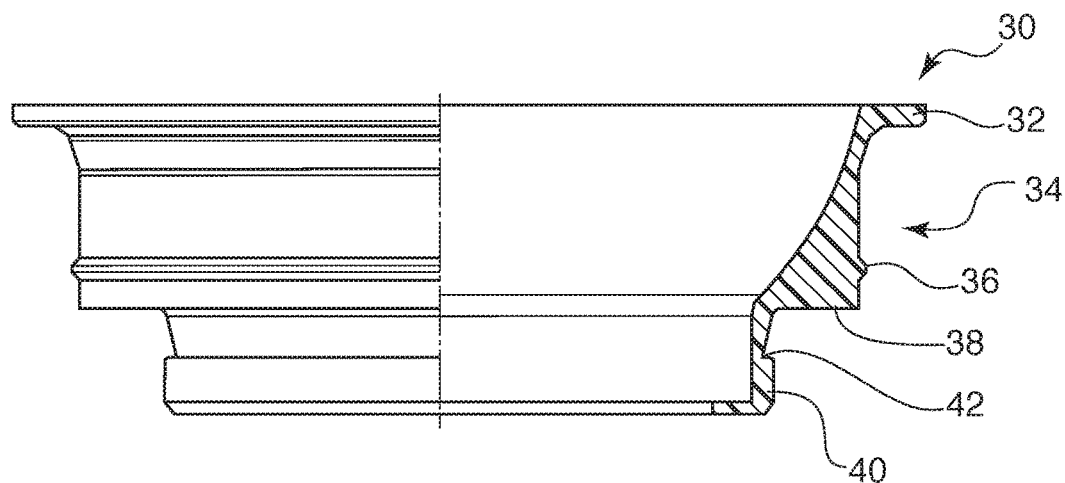
FIG. 7 shows a side partial cross-sectional view of a lower shell of the drain ball valve of FIG. 1.
Figure 10:
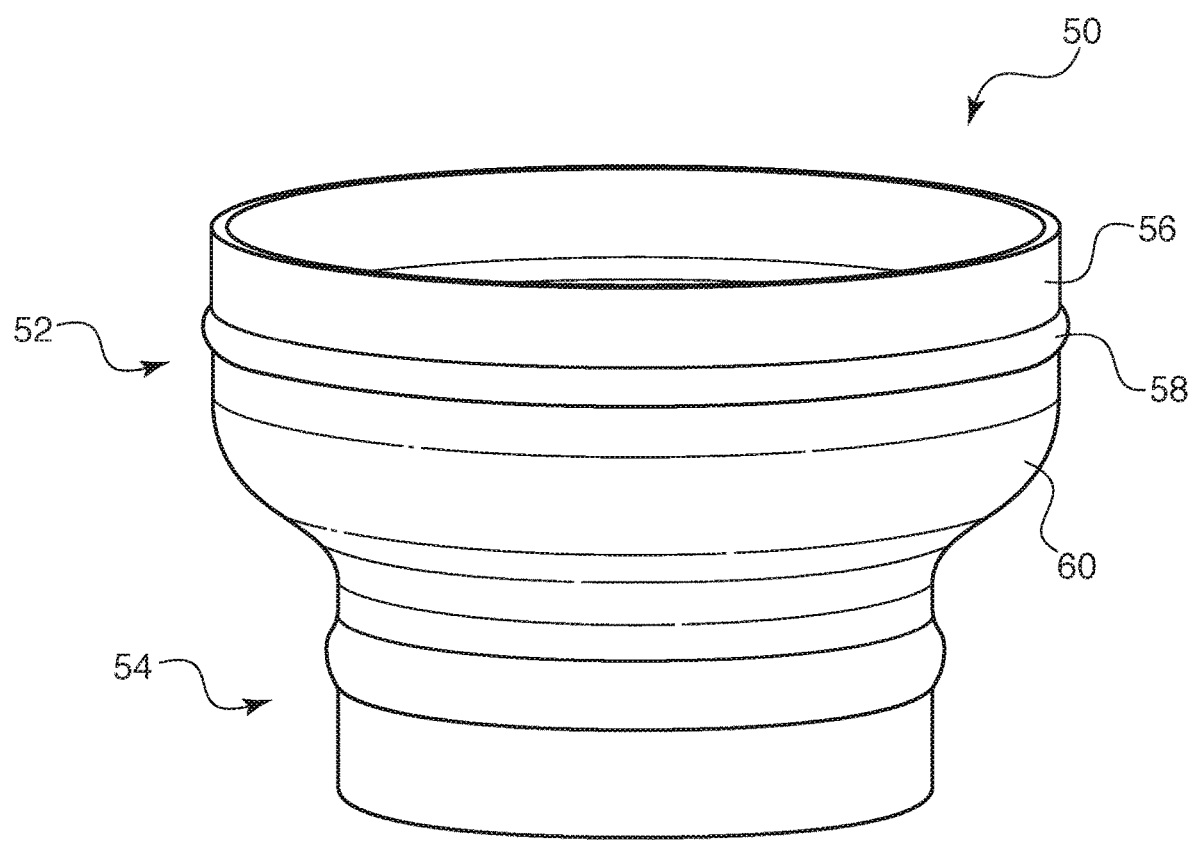
FIG. 10 shows a side perspective view of one embodiment of a bellow component.
Figure 11:
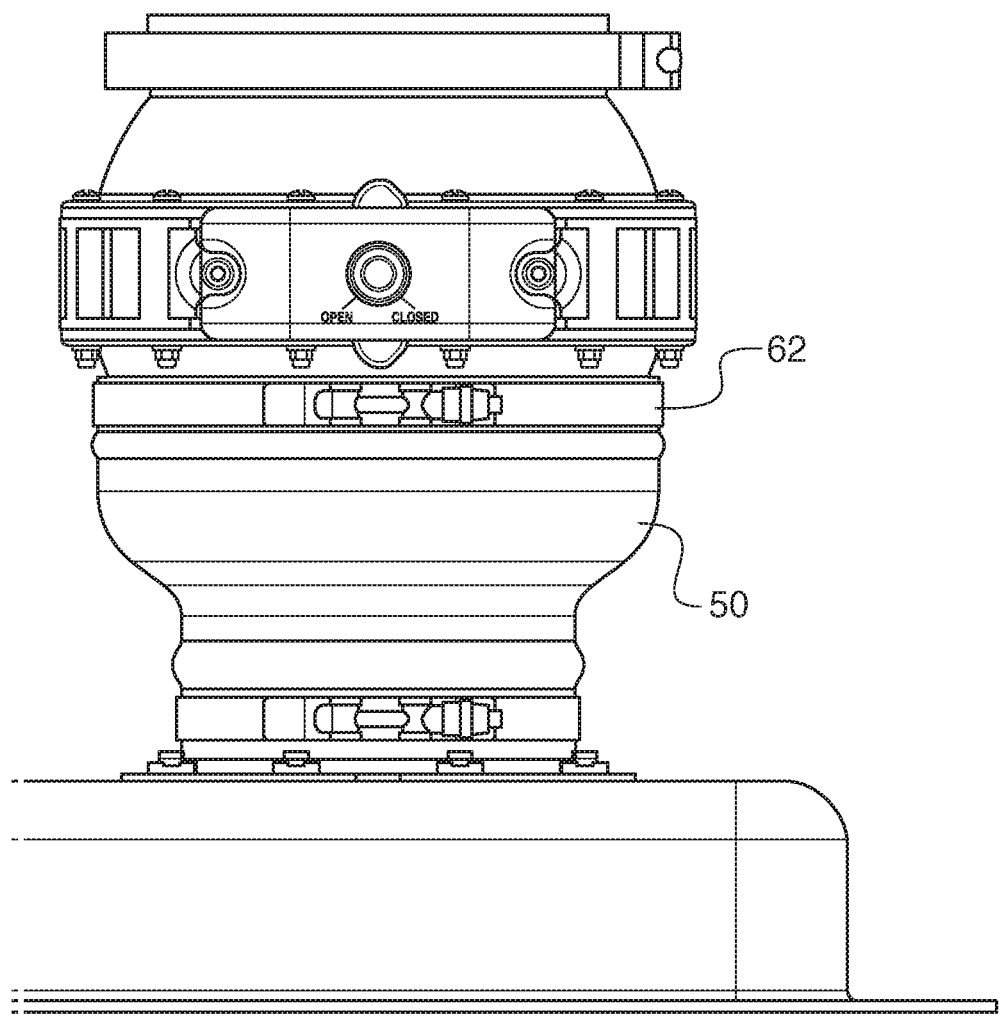
FIG. 11 shows a side plan view of a drain ball valve secured to a service panel.

The drain ball valve 10 also has a lower shell 30, illustrated in partial cross-sectional view by FIG. 7. The lower shell 30 may be designed to interface with a funnel (shown by FIGS. 8A and 8B) and/or bellow component 50, shown in FIG. 9 and described in more detail below. FIG. 10 shows a side view (in partial cross-section) of the lower shell 30 with a funnel 40 in place. FIG. 11 shows a side view of the lower shell 30 with a bellow component 50 in place. FIG. 3 shows a side view of the lower shell 30 with a bellow component 50 in place, with the bellow component 50 showed transparent so that the funnel 44 is visible.

Referring now back to FIG. 7, the lower shell 30 has a circumferential flange 32 leading downwardly to a side wall 34. The side wall has a beaded end 36, which may be used to support the flexible bellow component 50. The beaded end 36 provides a side protrusion that can support an inner wall/inner mating surface of the bellow component 50. When the bellow component 50 is positioned over the beaded end 36, a clamp may be tightened around the bellow component in order to secure the bellow into place The inner mating surface of the bellow component 50 can be generally flat and can conform to the ball valve beaded end 36 as the clamp is tightened around the two parts in order to secure them together. Extending distally from the side wall 34 is a wall ledge 38. Further distally from the wall ledge 38 is a reduced diameter lower wall 40. The lower wall 40 can include an optional notch 42 that can be used to support an optional funnel 44. The design principle of providing a funnel is to maximize the drain opening and also provide a clear direction into the service panel adapter 48. The funnel 44 may be an internal funnel, guiding the waste through the bellow component 50 during draining.

Figure 8A:
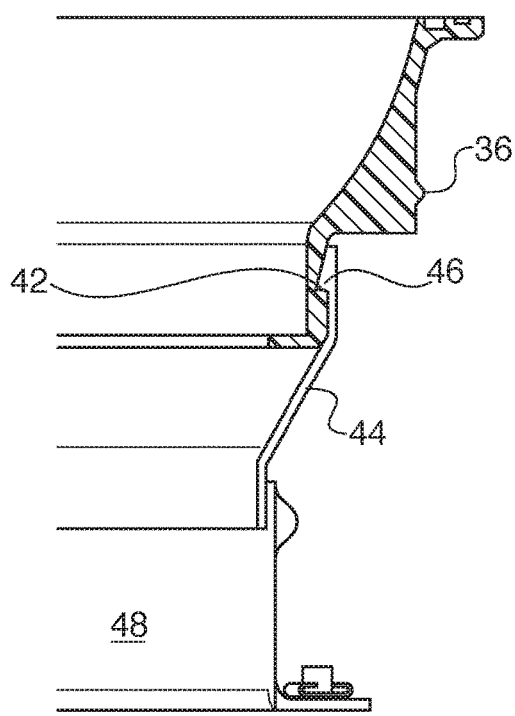
FIG. 8A shows a side cross-sectional view of the lower shell of FIG. 7 with a funnel secured thereto.
Figure 8B:
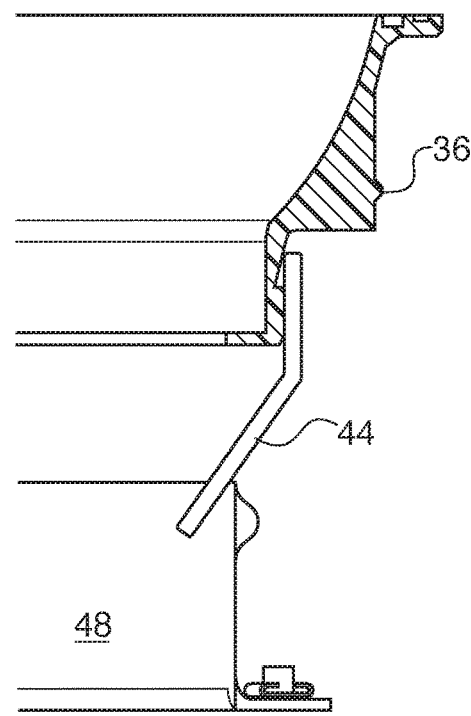
FIG. 8B shows a side cross-sectional view of the lower shell of FIG. 7 with an alternate funnel secured thereto.
Figure 9:
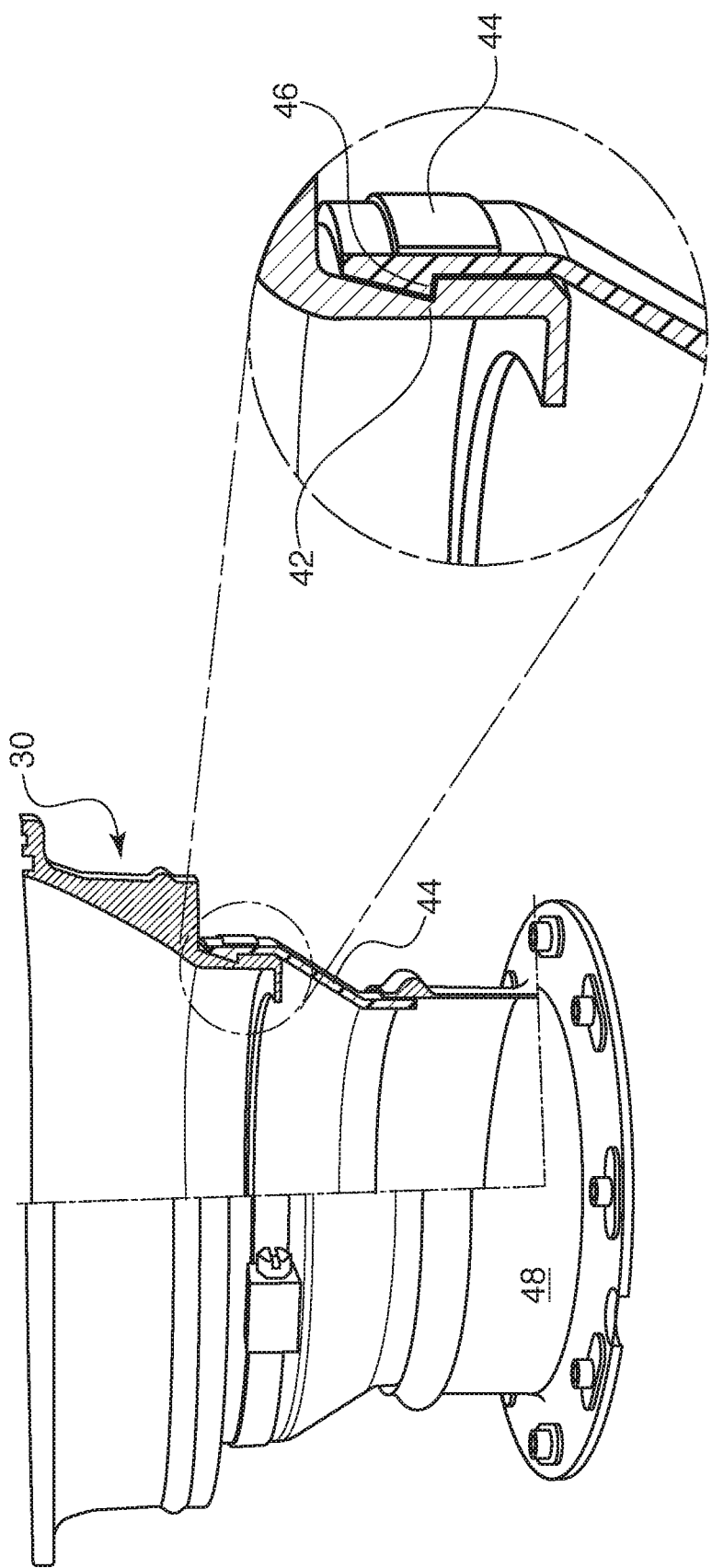
FIG. 9 shows a side partial cross-sectional view of a lower shell, a final, and a service panel adapter.

Two exemplary funnel 44 options are illustrated by FIGS. 8-9. These figures show a funnel 44 with a hook 46 configured to be received by the notch 42, providing a mechanical lock. FIG. 8A shows a funnel with a lower angle that is received by the service panel adapter 48. FIG. 8B shows a funnel with a straight wall that is guided into the service panel adapter 48.

The funnel may be made of a flexible material such as nitrile rubber. Specific examples may be nitrile per AMS-P-5315, 65+/−5 durometer/hardness and/or RUBBER per MIL-PRF-6855F. Other examples are possible and considered within the scope of this disclosure.

The general goal is that it does not become brittle during use. It is also possible for the funnel to be covered with plies of fiberglass, and/or coated with neoprene. Any materials that are suitable for platforms and waste applications are possible. Other appropriate material options are possible and considered within the scope of this disclosure.

A bellow component 50 is shown by FIG. 9 (and secured with respect to the lower shell in FIGS. 3 and 11). The bellow component 50 may be made of a flexible material, such that it can be stretched to fit in place over the sidewall 34 of the lower shell 30 and be flexible in the event that movement between the ball valve 10 and the service panel takes place. The bellow component 50 may have an upper portion 52 with a first circumference and a lower portion 54 with a second smaller circumference. In a specific example, the first circumference may be about 6 inches in diameter and the second smaller circumference may be about 4 inches in diameter. The upper portion 52 is shown having an upper side 56, a groove 58, and a curved side 60. The upper side 56 is shaped and configured to fit over the side wall 34 of the lower shell 30, and when positioned, the groove 58 receives the beaded end 36 of the side wall 34. Once positioned, a clamp 62 may be positioned around the upper side 56 to secure the bellow component 50 with respect to the lower shell 30. Clamp 62 may be a hose clamp or any other appropriate clamp that can secure the bellow component 50 into place. The bellow component 50 is generally desired to be made of a material that can withstand repeated freezing without damage under extreme environments. The material should also be able to withstand deflection based on aircraft loads. Possible materials include but are not limited to rubber constructions, such as nitrile rubber. The materials for both the bellow component and the funnel may be the same. The materials may have different layer counts and/or constructions in order to achieve the desired flexibility. The material may be coated with various plies of fiberglass and/or coated with neoprene. Any materials that are suitable for platforms and waste applications are possible. Other appropriate material options are possible and considered within the scope of this disclosure.

Figure 12:
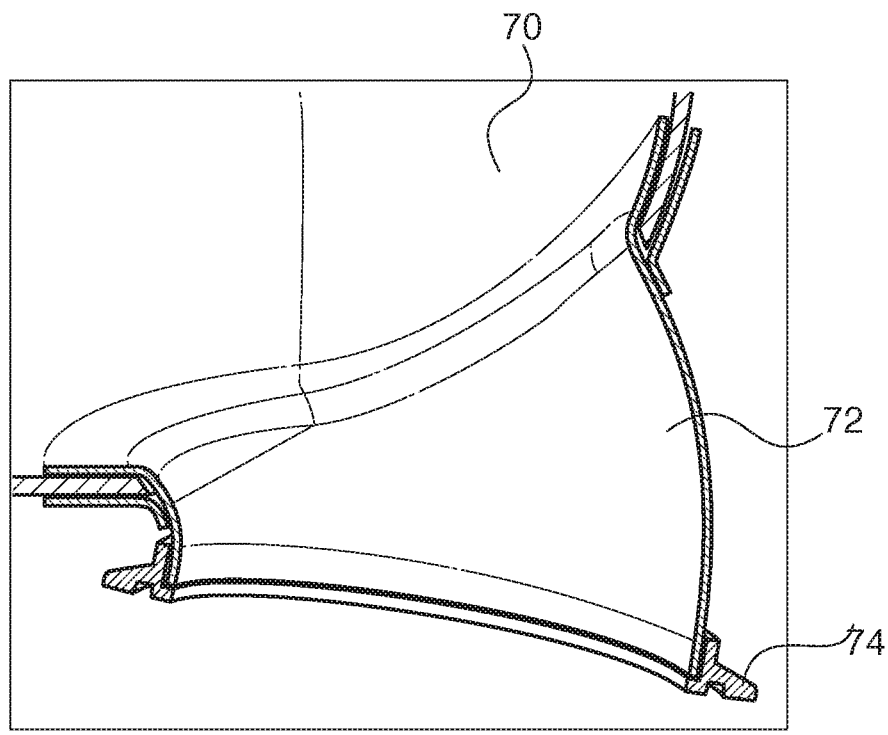
FIG. 12 shows a side cross-sectional view of a tank drain of a waste tank.
Figure 13:
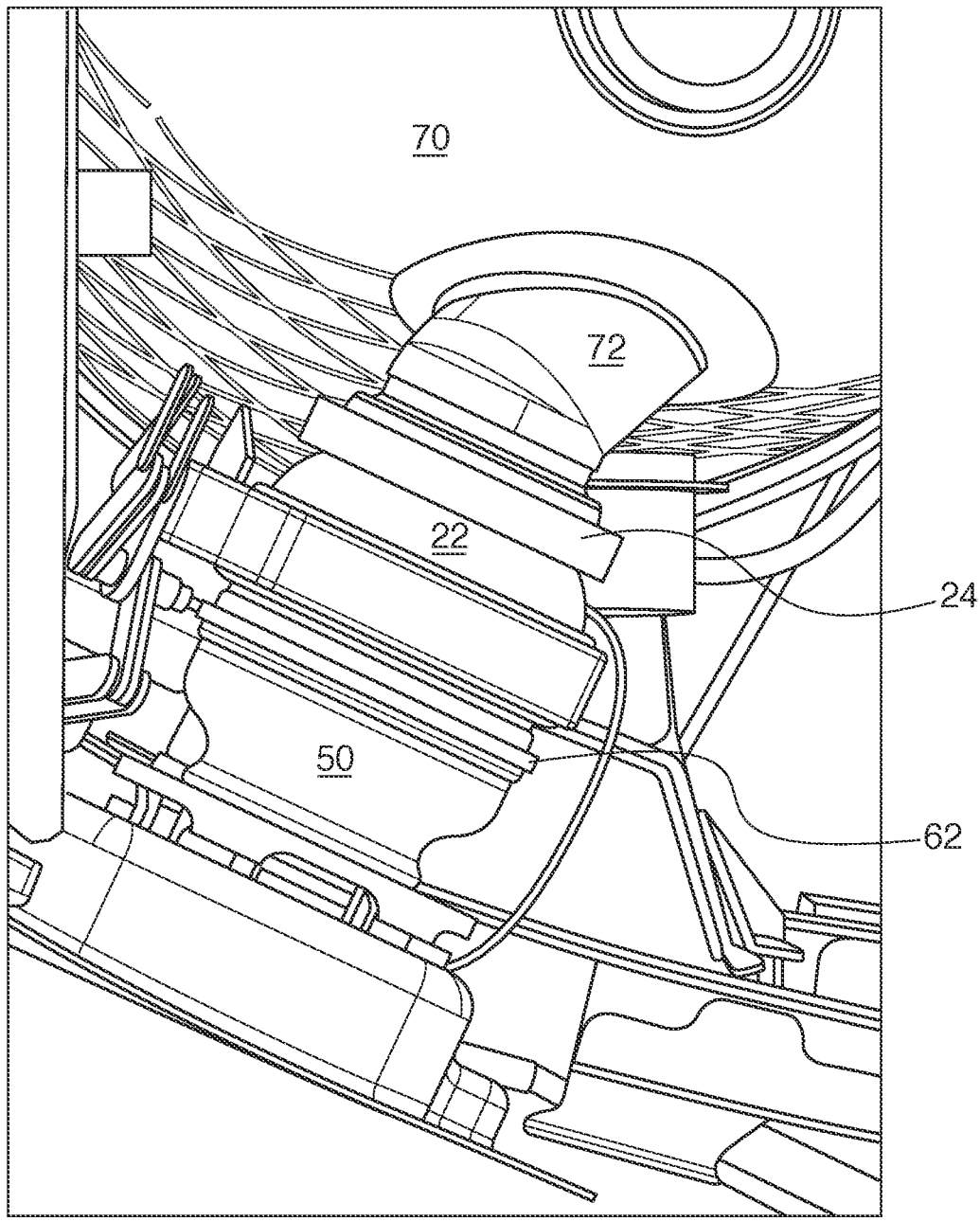
FIG. 13 shows a front perspective view of a drain ball valve secured to a waste tank and a service panel.
Figure 14:
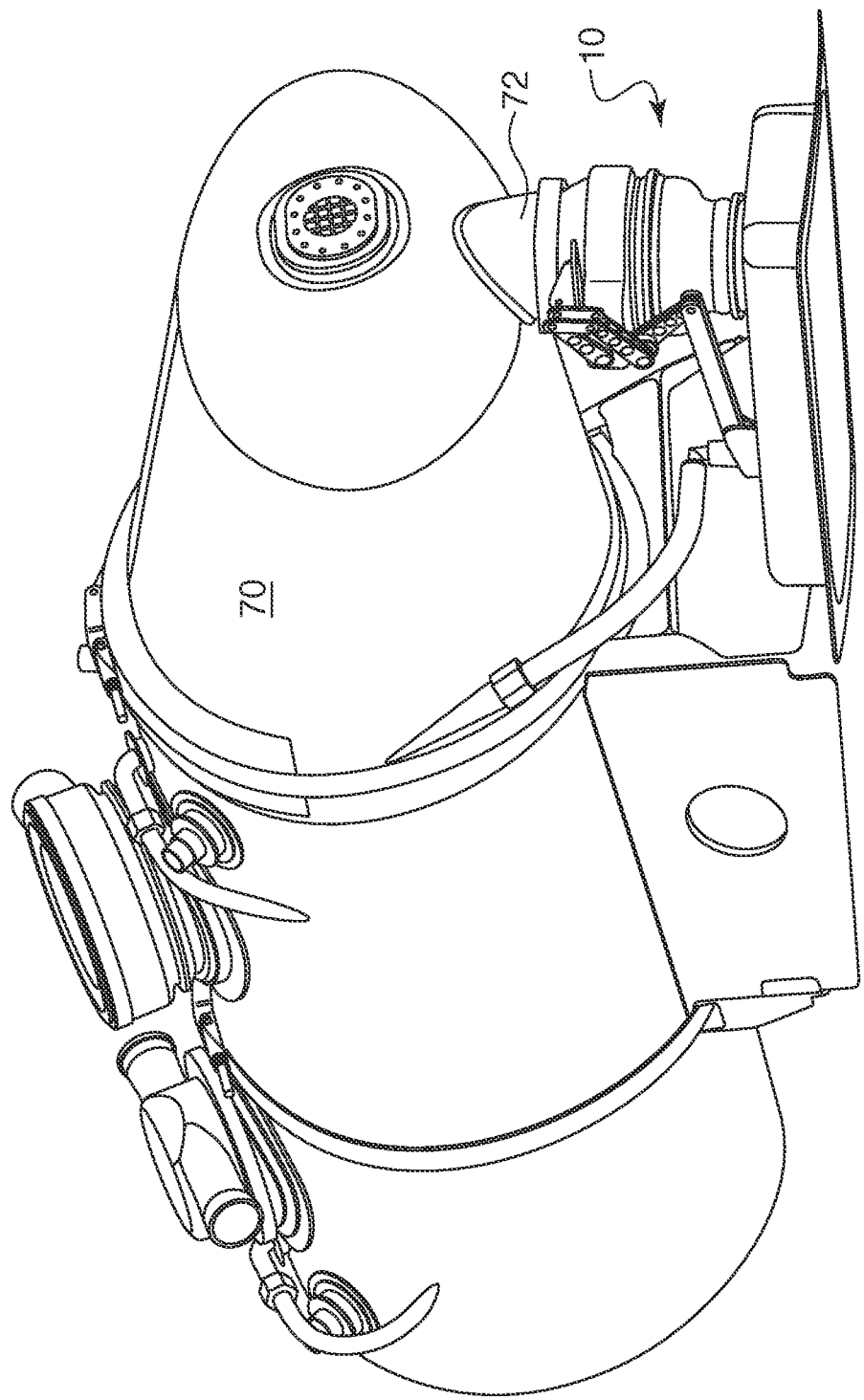
FIG. 14 shows a full perspective view of a waste tank with a drain ball valve mounted thereon, mounted on a service panel.

FIGS. 12-14 illustrate how the disclosed drain ball valve 10 may be assembled with respect to a waste tank 70. FIG. 12 illustrates a close-up view of a tank drain 72 of a waste tank 70. The tank drain 72 is shown having a V-band interface flange 74. As the drain ball valve 10 is secured to tank drain 72, a V-band clamp or coupling 24 may be secured around the first circular flange 18 of the upper shell 14 and the V-band interface flange 74 of the tank drain 72. FIG. 4 shows a side cross-sectional view of the V-band clamp 24 securing the flanges 18, 74. FIG. 13 shows a view of the drain ball valve 10 mounted on the tank drain 72 of the waste tank 70. FIG. 14 shows a full perspective view of a waste tank with a drain ball valve mounted thereon.

Figure 15:
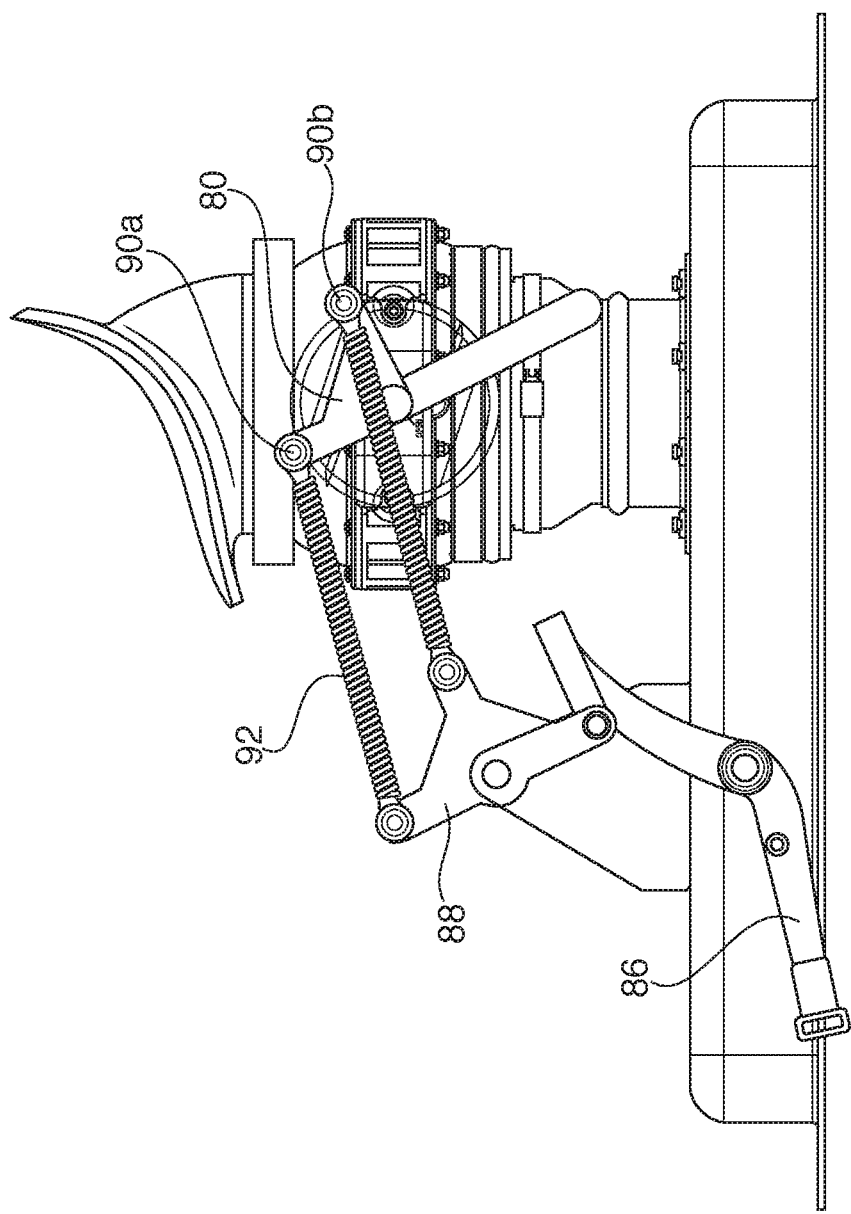
FIG. 15 shows a side plan view of one embodiment of actuation of the drain ball valve described herein.
Figure 16:
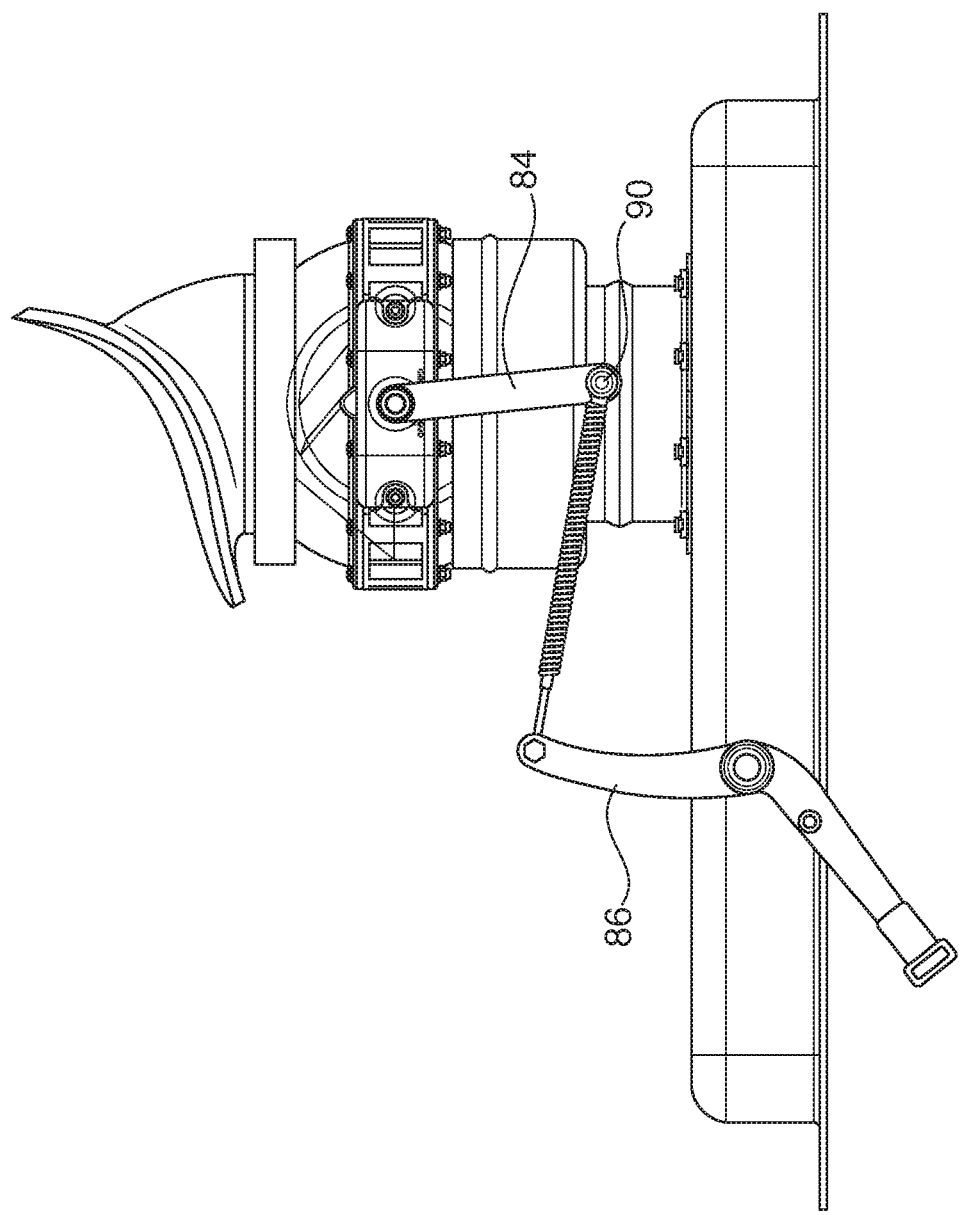
FIG. 16 illustrates an alternate embodiment of actuation.
Figure 17:
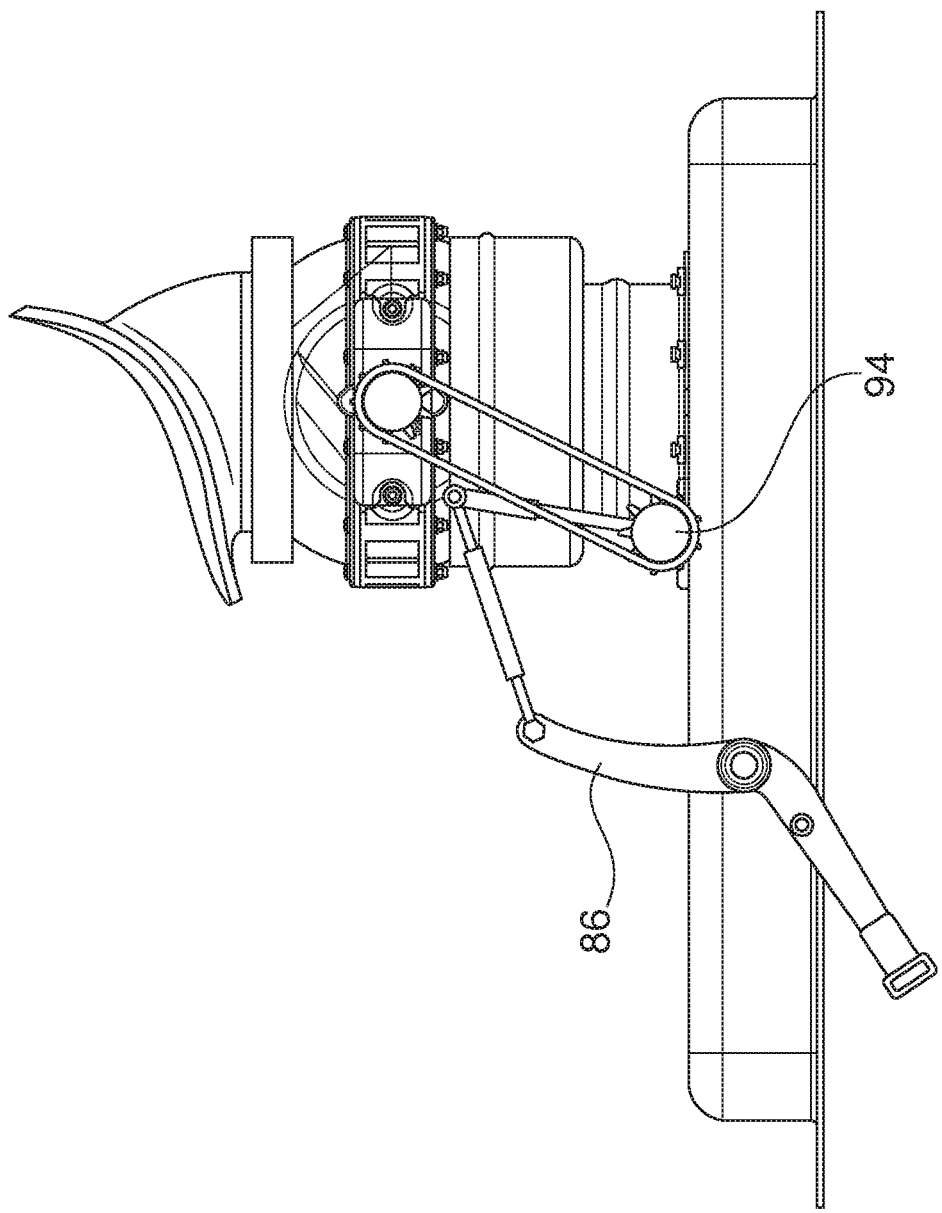
FIG. 17 illustrates a further embodiment of actuation.

FIGS. 15-17 show possible actuation assemblies that may be associated with the shaft 82 and handle 84 in order to open and close the ball valve. In one example, a bracket 80 may be attached to the interface shaft 82 that cooperates with the handle shaft 82 and handle 84. FIG. 15 shows an arm 86 that can be actuated in order to move an intermediate bracket 88 which is secured to two points 90a and 90b on the bracket 80. Securement may be via springs 92 or any other appropriate connection mechanism. FIG. 16 shows an alternate embodiment that works similarly, but uses only a single securement point 90 on the handle 84. The arm 86 is connected without an intermediate bracket. FIG. 17 shows and a further embodiment for actuation. In this example, arm 86 is secured to rotatable member 94. Movement of the arm 86 causes movement of the rotatable member, which opens and closes the ball valve.

Beneficial features of the disclosed drain ball valve include but are not limited to its low clearance installation envelope. Providing the described modified upper shell 14 geometry allows a portion of the shell 14 to be inserted into the interfacing plumbing line 26. This can be done all while maintaining the current sealing principles and current ball opening diameters of the currently available tanks and valve bodies. This disclosure of the upper/lower shell modification allows the installation envelope to be reduced by about 2.5 inches. The disclosed V-band can secure the shell to the tank drain. The disclosed bellow can help enclose any waste that could potentially seep out from the connection area.

The disclosed V-band connection and beaded and connection are provided as examples only. It should be understood that other connection options are possible and considered within the scope of this disclosure. For example, the connections may be customized to the particular aircraft in use. The connections may be bolted connections depending upon the interfacing plumbing line connection and clearance requirements.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A drain ball valve for use in connection with a fluid-holding tank having a tank drain, the drain ball valve comprising:
an upper shell comprising:
a first circular flange including a first circumference;
a second circular flange including a second circumference, wherein the second circumference is larger than the first circumference;
a curved face extending between the first circular flange and the second circular flange; and
an upper raised wall configured to be received within a plumbing line of the tank drain, wherein the upper raised wall extends up from the first circular flange that abuts a lower end flange of the tank drain;
a bellow component comprising:
a groove including an outer circumference;
an upper portion include a third circumference; and
a lower portion including a fourth circumference, wherein the fourth circumference is smaller than the third circumference, and wherein the outer circumference is greater than the third circumference and the fourth circumference;
a lower shell comprising:

a beaded end for coupling to an inner circumference of the groove;

a connection area for receiving the bellow component;

a notch configured to receive a hook of a funnel; and the funnel coupled with the lower shell, wherein the funnel is housed entirely within the bellow component.

2. The valve of claim 1, further comprising a clamp securing the lower end flange and first circular flange to one another.

3. The valve of claim 1, wherein the connection area of the lower shell comprises the beaded end.

4. The valve of claim 1, wherein the bellow component comprises an inner mating surface that cooperates with the connection area of the lower shell.

5. The valve of claim 1, further comprising a clamp configured to secure the bellow component to the lower shell.

6. The valve of claim 1, further comprising a handle that cooperates with an arm to actuate the drain ball valve.

7. The valve of claim 1, wherein the funnel is a flexible material.

8. The valve of claim 1, wherein the funnel is coated with plies of fiberglass.

9. The valve of claim 1, wherein the funnel is coated with polychloroprene.

10. The valve of claim 1, wherein the tank drain includes a curved surface which conforms to a surface of the fluid-holding tank.

11. The valve of claim 1, wherein the bellow is made of a first material and the funnel is made of a second material, and wherein the first material is the same as the second material.

12. The valve of claim 1, wherein the bellow is made of a first material and the funnel is made of a second material, and wherein the first material is different than the second material.

13. A fluid-holding tank assembly comprising:

a holding tank including a tank drain; and a drain ball valve comprising:

an upper shell comprising:

a first circular flange including a first circumference;

a second circular flange including a second circumference, wherein the second circumference is larger than the first circumference;

a curved face extending between the first circular flange and the second circular flange; and an upper raised wall configured to be received within a plumbing line of the tank drain, wherein the upper raised wall extends up from the first circular flange that abuts a lower end flange of the tank drain;

a bellow component comprising:

a groove including an outer circumference;

an upper portion include a third circumference; and a lower portion including a fourth circumference, wherein the fourth circumference is smaller than the third circumference, and wherein the outer circumference is greater than the third circumference and the fourth circumference;

a lower shell comprising:

a beaded end for coupling to an inner circumference of the groove;

a connection area for receiving the bellow component;

a notch configured to receive a hook of a funnel; and the funnel coupled with the lower shell, wherein the funnel is housed entirely within the bellow component.

14. The valve of claim 13, further comprising a clamp securing the lower end flange and first circular flange to one another.

15. The valve of claim 13, wherein the connection area of the lower shell comprises a beaded end.

16. The valve of claim 13, wherein the bellow component comprises an inner mating surface that cooperates with the connection area of the lower shell.

17. The valve of claim 13, further comprising a clamp configured to secure the bellow component to the lower shell.

18. The valve of claim 13, further comprising a handle that cooperates with an arm to actuate the drain ball valve.

* * * * *